March 15, 1960 E. A. BENNETT 2,928,516
STOP MECHANISM
Filed Feb. 20, 1959
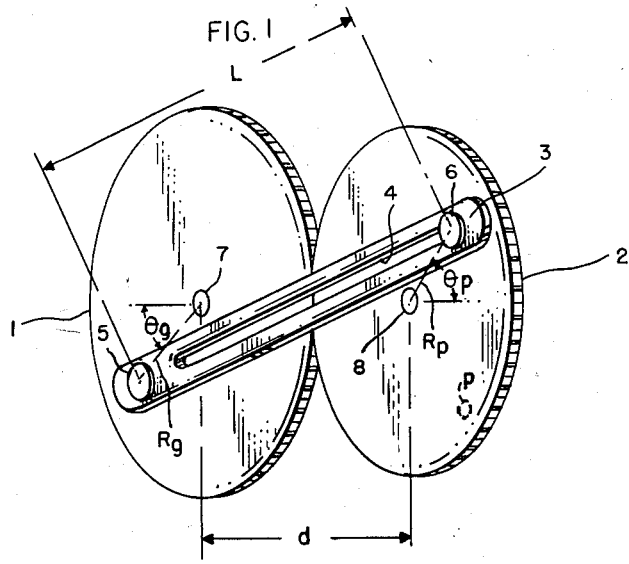
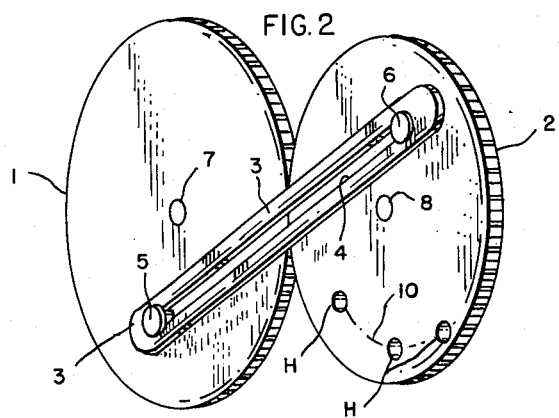
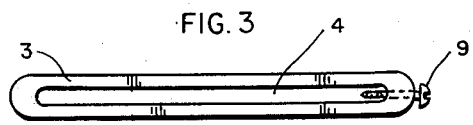
INVENTOR,
EDWARD A. BENNETT
BY
Harry M. Saragovitz
ATTORNEY.

United States Patent Office 2,928,516
Patented Mar. 15, 1960

2,928,516
STOP MECHANISM

Edward A. Bennett, Haddonfield, N.J., assignor to the United States of America as represented by the Secretary of the Army Application February 20, 1959, Serial No. 794,786

3 Claims. (Cl. 192—138)

This invention relates to stop mechanisms and particularly to shaft positioning devices of improved construction.

A primary object of this invention is to provide means for stopping rotating parts of machines after a predetermined number of turns.

Another object of this invention is to provide such means as will cause a positive stop at the desired point.

A further object of this invention is to provide a stopping mechanism for rotating parts with means for easily and accurately adjusting the stopping position.

A further object of this invention is to provide means which will not cause the parts affected to bind.

An additional object of this invention is to provide such means as will cause a minimum of wear and tear on the rotable members.

The features of this invention which are believed to be novel are set forth with particularity in the appended claims. The present invention itself, both as to its organization and manner of operation, together with further objects and advantages thereof may best be understood by reference to the following description taken in connection with accompanying drawings, in which like characters refer to similar parts and in which:

Figure 1 is a perspective view of one embodiment in accordance with this invention showing the link and the pins in the stop position;

Figure 2 is a perspective view of a modification of Figure 1; and

Figure 3 is a top view of an adjustable link for use in conjunction with the embodiments of Figures 1 and 2.

In accordance with this invention, the positive stop mechanism includes two gears in mesh, one of these gears having at least one tooth less than the other. A pin is inserted perpendicularly to the plane of each of the gears, and a sliding link of fixed or variable length L is mounted on the two pins. Since there is at least one tooth difference between the two gears, the pin on one gear will gain in position relative to the pin on the other with each revolution; when the two pins approach such positions that their separation would exceed the length of the slot, the gears are locked by the link.

In Figure 1, gear 1 and pinion 2 in mesh are mounted upon shafts 7 and 8, respectively. Pin 5 is inserted into the gear at a distance $R_g$ from its center; similarly pin 6 is at a distance $R_p$ from the center of the pinion. Link 3 is rotatably secured at one end thereof to gear 1 by pin 5. The other pin 6 is slideably mounted within slot 4 of link 3. The pins are suitably headed to retain link 3 thereon.

In operation, pinion 2 has at least one tooth less than gear 1. Therefore, when shafts 7 and 8 rotate, pin 6 will gain in position relative to pin 5 with each revolution; when the gears approach positions at which the distance between the two pins would exceed the length of the slot, the gears will be locked in position.

The design parameters of the embodiment of Figure 1 are: $d$, the distance between shafts 7 and 8, $\theta_p$ and $\theta_g$ the angles between the line joining the centers of the gears and the centers of pins 5 and 6, respectively; the number of teeth on the gear and the pinion and the length of the slot. In practice, most of the above parameters are fixed by other design considerations. $R_g$ and $R_p$ are suitably selected to make pins 5 and 6 as near their respective circumferences as possible; also, the distance $d$ between the centers of the gears and the number of teeth on gear 1 are usually predetermined. It can be easily shown mathematically that the length of the slot 3 is a function of $R_p$, $d$ and the number of teeth on gear 1. Knowing the length of the slot, $\theta_p$ and $\theta_g$ can be found from the simultaneous solution of two equations. The number of teeth on pinion 2 depends on the number of teeth on gear 1. The difference between the respective numbers of teeth should be at least equal to one; the greater this difference the sooner the gears will be locked.

In Figure 1, the gears are shown in the locked position. To unlock the gears the pinion must be rotated in a counterclockwise direction until the pin of the pinion will become locked again. This will occur at a point P symmetrically located with respect to the line joining the centers of the gears.

In Figure 2 is shown another embodiment in accordance with this invention, wherein both pins slide in slot 4 of link 3. The operation and the construction of this embodiment is otherwise similar to the one shown in Figure 1, except that the total length of the link can be made smaller than the total length of the diameters of the gear and the pinion. This will avoid a portion of the link to protrude outside the gears.

In Figure 3, link 3 of Figures 1 or 2 is provided with an adjustable screw 9. By presetting the screw in different positions, the number of revolutions in which the gears will come to a stop may be varied.

Several holes H can be drilled, into pinion 2 along a predetermined dotted path 10 as shown in Figure 2. By pressing the pin into these various holes, a great number of stop positions can be obtained.

It will of course be understood that a third gear, not shown, may be provided for driving gear 1 and pinion 2.

While particular embodiments of the present invention have been shown and described, it will be obvious to those skilled in the art that changes and modifications may be made without departing from the true spirit and scope of this invention.

What is claimed is:

1. A stop mechanism for positively preventing the rotation of meshed gears having flat, coplanar surfaces after a predetermined number of revolutions including, in combination, a driving gear, a driven gear, said driving gear having at least one tooth less than said driven gear; a pin fixedly inserted perpendicularly to the flat surface of each gear; and a flat link, having a slot therein, mounted on the pins for stopping the rotation of the gears when the distance between the pins exceeds the length of the slot, at least one of said pins passing through said slot.

2. The stop mechanism of claim 1 wherein both said pins are engaged in said slot.

3. The combination of claim 2 comprising means for adjusting the length of said slot.

References Cited in the file of this patent

FOREIGN PATENTS 538,027    Canada _____ Mar. 12, 1957